United States Patent [19]

Albrecht et al.

[11] Patent Number: 4,894,198

[45] Date of Patent: Jan. 16, 1990

[54] PROCESS FOR PRODUCING HOLLOW BODIES OF ORIENTED THERMOPLASTIC MATERIAL

[75] Inventors: Peter Albrecht, Hamburg; Karl-Heinz Balkau, Oststeinbek; Vinco Cujic, Hamburg; Tilman Döring, Hamburg; Claus Horwege, Hamburg; Wolfgang Reymann, Hamburg; Klaus Vogel, Barbüttel; Walter Wiedenfeld, Hamburg, all of Fed. Rep. of Germany

[73] Assignee: Krupp Corpoplast, Hamburg, Fed. Rep. of Germany

[21] Appl. No.: 129,025

[22] Filed: Dec. 4, 1987

[30] Foreign Application Priority Data

Feb. 25, 1987 [DE] Fed. Rep. of Germany ....... 3705947

[51] Int. Cl.$^4$ .................. B29C 55/22; B29C 57/00; B29C 53/08; B29C 49/64
[52] U.S. Cl. .................................. 264/521; 264/292; 264/296; 264/533; 264/320; 264/322; 425/393; 425/398; 425/400; 425/525; 425/526
[58] Field of Search ............ 264/520, 521, 531, 532, 264/533, 534, 535, 573, 292, 294, 296, 320, 322, 327, 345, 346, 348; 425/525, 526, 529, 387.1, 392, 393, 395, 398–400, 342.1

[56] References Cited

U.S. PATENT DOCUMENTS 4,412,966 11/1983 Yoshino et al. .................... 264/296
4,704,243 11/1987 Nilsson et al. ..................... 264/296

FOREIGN PATENT DOCUMENTS

WO86/03713 7/1986 PCT Int'l Appl. .

*Primary Examiner*—Jan H. Silbaugh
*Assistant Examiner*—Neil M. McCarthy
*Attorney, Agent, or Firm*—Panitch Schwarze Jacobs & Nadel

[57] ABSTRACT

In a process for producing hollow bodies of oriented thermoplastic material, a hollow blank having a bottom portion and a substantially cylindrical wall portion with an opening at its end remote from its bottom portion is subjected to pre-expansion in the region of the opening and then thermofixing in a subsequent treatment step. The thermofixing operation may be preceded by a mechanical expansion operation for orienting the plastic material forming the wall portion of the blank.

11 Claims, 10 Drawing Sheets

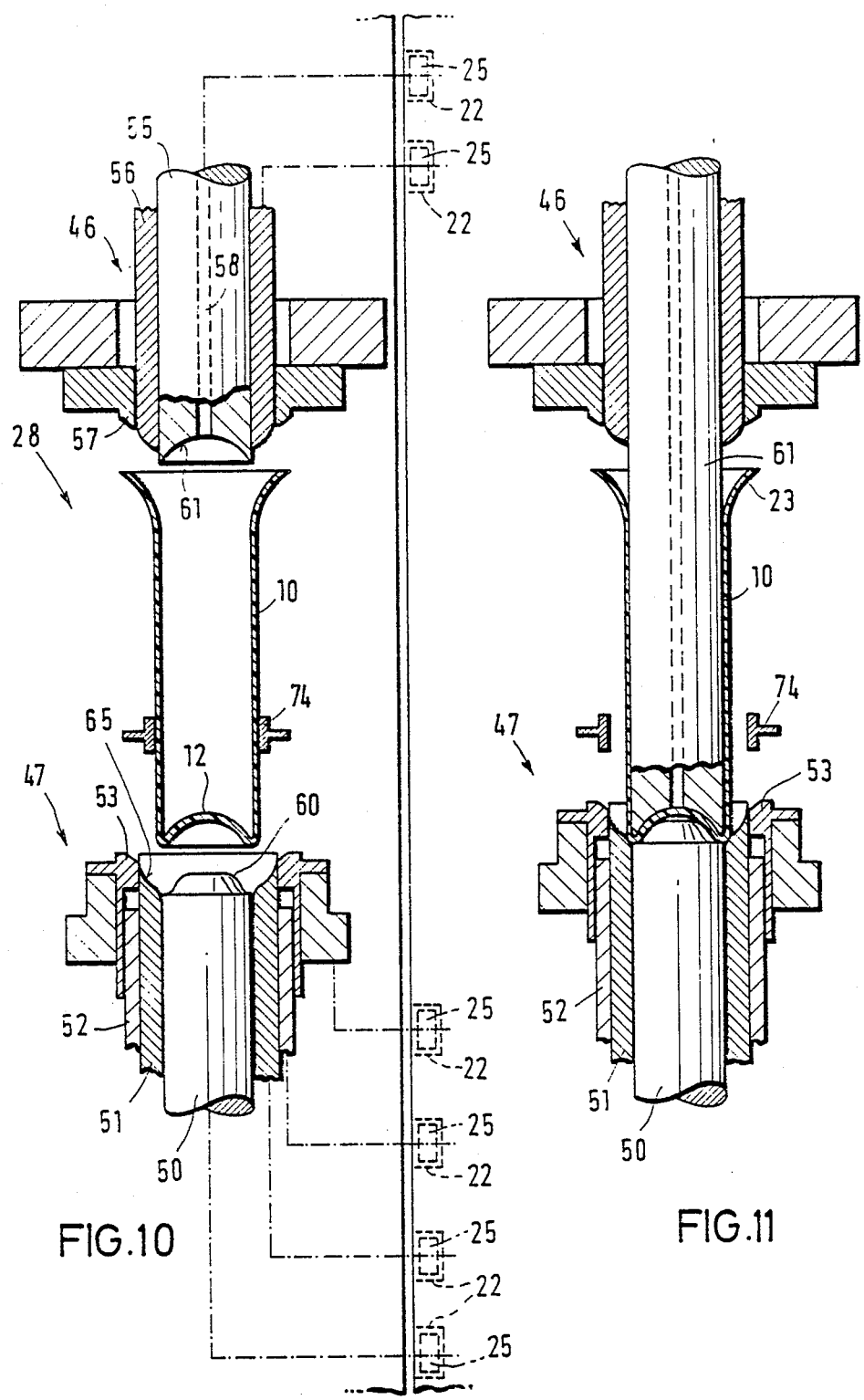

PROCESS FOR PRODUCING HOLLOW BODIES OF ORIENTED THERMOPLASTIC MATERIAL

BACKGROUND OF THE INVENTION

One form of process and apparatus for producing hollow bodies from oriented thermoplastic material involves a mode of operation in which a blank which is produced for example by molding and which has a substantially cylindrical wall portion and a bottom portion is subjected to a treatment consisting of a plurality of steps, in which at least a part of the blank is subjected to a variation in temperature, deformed or shaped and then subjected to thermofixing.

Such a process is employed, particularly when using preforms of linear polyesters, for example polyethylene teraphthalate (PETP) or polybutylene teraphthalate (PEBTP), for example when there is a need to produce containers for materials to be contained therein, under a high pressure, such as for example carbon dioxide-bearing drinks.

That procedure may involve for example stretching the wall of a blank at a temperature below the vitreous transition temperature of the material forming same to provide an intermediate product or parison which is subjected to expansion at least over the major part of its longitudinal extent, and then subjected to a thermofixing operation.

In another alternative form of the procedure involved, an intermediate product is firstly produced by stretch blow molding, the plastic material which is shaped in that operation already being subjected to orientation in the axial direction and in the peripheral direction during the blow molding process. In that case it will essentially only then be necessary to provide for thermofixing of the wall portion of the intermediate product. Irrespective of the way in which the intermediate product is produced, the thermofixing operation is intended to ensure that the final product can be heated up to a given maximum temperature which is necessary in regard to containers for example for sterilising the content thereof, without the final product experiencing a significant alteration in its shape, due to the increased temperature involved in the heating operation. It is also desirable to ensure that the plastic material which forms the container or another kind of end product does not undergo shrinkage, under the effect of the heat applied.

Depending once again on the method of manufacture of the intermediate product, the thermofixed hollow body may also be subjected if necessary to further treatment, for example for the purposes of shaping the wall regions thereof which adjoin its opening in order in that way to produce a can which can then be closed by means of a conventional cover.

SUMMARY OF THE INVENTION

An object of the present invention is to provide a process for producing hollow bodies of oriented thermoplastic material which permits a blank to be subjected to various shaping and thermofixing operations in a simple mode of operation without the use of complicated operating means.

Another object of the present invention is to provide a process for producing hollow bodies of oriented thermoplastic material adapted to produce such bodies in large numbers from a simple form of blank by a simple sequence of operating procedures.

Still another object of the present invention is to provide a process for the production of hollow bodies of oriented thermoplastic material from a hollow molded blank, which provides for careful temperature control of said blank in the course of making it into said hollow body.

A further object of the present invention is to provide a process for the production of a hollow body of oriented thermoplastic material without involving major difficulties due to uncontrolled shrinkage or other deformation of the blank or the hollow body.

Yet a further object of the present invention is to provide an apparatus for producing hollow bodies from oriented thermoplastic material, which is suitable for production thereof on a large-scale mass-production basis.

A still further object of the invention is to provide an apparatus for producing hollow bodies of oriented thermoplastic material, which involves simple components operable to carry out simple operating procedures.

Yet a further object of the present invention is to provide an apparatus for producing hollow bodies of oriented thermoplastic material, which is adapted to permit close control over the temperature and shaping operations involved therein without requiring complicated apparatus structure.

In accordance with the present invention, in terms of the process, these and other objects are achieved by a process for producing hollow bodies of oriented thermoplastic material which have a bottom portion, a wall portion adjoining the bottom portion and an opening, wherein a blank which is produced for example by molding and which comprises a substantially cylindrical wall portion and a bottom portion is subjected to a treatment which consists of a plurality of treatment steps, with at least the wall portion then being thermofixed. In the treatment steps, an end portion of the blank at which said opening is provided is subjected to a pre-expansion operation, whereupon the pre-expanded end portion is clamped as by suitable clamping means and then a heated mandrel is introduced into the blank by virtue of a relative movement between the mandrel and the blank. The mandrel bears against the inside wall surface of the wall portion of the blank and is effective to heat at least the wall portion of the blank to the temperature required for the thermofixing effect.

Further in accordance with the invention, in terms of the apparatus, the above-indicated and other objects are attained by an apparatus for producing hollow bodies of oriented thermoplastic material from a blank which is produced for example by molding and which comprises a bottom portion and a wall portion, by means of a procedure wherein the wall portion of the blank is subjected to a thermofixing operation. Thermofixing is effected by a heated mandrel which is introduced into the blank. The apparatus further comprises a heatable tapering mandrel which is adapted to be introduced into the open end of the blank in order to provide for pre-expansion of the end portion thereof. The tapering mandrel is adapted with its end portion which is to be introduced into the blank, to the cross-section of the blank and it tapers towards its free end. The region of the mandrel which causes expansion of the blank to provide the configuration of the hollow body is delimited by a surface which extends in a substantially linear or concave configuration in longitudinal section.

The above-mentioned operation of subjecting the end portion of the blank which has the opening thereat to a pre-expansion effect serves essentially two aims: on the one hand it provides for introduction of the temperature-control mandrel which provides for heating the blank and which must be at least of an outside diameter which is no smaller than and preferably even somewhat greater than the inside diameter of the blank into which it is to be introduced, as the heating operation requires a satisfactory contact between the peripheral surface of the temperature-control mandrel and the inside surface of the wall portion of the blank. Without the end portion of the blank which is surrounding the opening being pre-expanded in that fashion, to a cross-section which is larger than the cross-section of the temperature-control mandrel, it would not be possible for the mandrel to be introduced into the blank, at any even not with the speed and reliability required for the purposes of mass production. In that connection it should be borne in mind that it will generally not be possible for the temperature-control mandrel to be of such a configuration as to taper towards its free end as that would be severely detrimental to the desired contact between the peripheral surface of the mandrel and the inside wall surface of the blank. The other function of pre-expansion of the blank is that of providing, in the region of the opening thereof, an edge portion which is bent away outwardly of the blank, relative to the remainder of the configuration of the wall portion of the blank which is generally axially extending, the above-mentioned clamping means engaging the outwardly-bent edge portion to hold the blank during the relative movement as between the blank and the temperature-control mandrel, so that the frictional forces which are applied to the blank by the outside peripheral surface of the temperature-control mandrel during the relative movement as between the mandrel and the blank do not cause unacceptable deformation of the blank, for example due to the formation of folds therein, or do not cause the blank to flex and yield as the mandrel is introduced thereinto.

In regard to the individual treatment operations which are to be carried out on the blank, it should be borne in mind that the blank is generally of a very thin-walled configuration so that the forces which are applied to the blank, for example for the purposes of carrying out shaping operations, must in any case be so controlled and distributed as to certainly avoid undesired and in particular irregular deformation, such as for example the formation of folds, due to an upsetting effect. That applies in particular in regard to those shaping operations in which the blank is not supported and held over its entire extent by specific support and holding elements, in such a way that the blank can undergo deformation only when and where the support and holding elements do not engage appropriate regions of the blank, being regions where a shaping operation is to be performed in respect thereof.

Account is taken of the foregoing factors in the operation of pre-expanding the end portion of the blank, by virtue of the fact that a heated mandrel which tapers towards its free end is introduced into the opening of the blank, for example under the effect of a spring means which urges it towards and thus into the blank, the mandrel being at a suitable temperature for softening the end portion of the blank which is to be subjected to pre-expansion, while the force applied to the mandrel by the above-mentioned spring means is such that deformation of the blank to cause pre-expansion of the end portion thereof occurs only upon the attainment of a given temperature and resulting softening of the end region of the wall portion of the blank, which is subjected to the action of the mandrel. The free end of the tapering mandrel is of an outside diameter which is smaller than the inside diameter of the opening in the end of the blank, prior to pre-expansion of the region of the blank defining the opening. The above-outlined mode of operation gives the advantage that a comparatively low force which is applied by the tapering mandrel to the end region of the wall portion of the blank is sufficient to cause pre-expansion thereof. The pre-expansion operation is performed in what might be considered to be an automatic fashion insofar as the degree of softening of the end region of the blank, which is to be pre-expanded, with a given force applied to the mandrel to urge it into the blank, determines the progress and thus the time of the pre-expansion operation. It is thus possible to eliminate a positive actuating arrangement for governing the period of operation of the mandrel, although it will be appreciated that certain fluctuations in regard to the duration of the pre-expansion operation may possibly occur from one blank to another, although such fluctuations tend to remain very slight having regard to the fact that the wall thickness of the blanks generally exhibit no or only slight fluctuations. In order to keep the length of the end region which is to be subjected to pre-expansion at least substantially constant form one hollow body to another, it is desirable for the distance to be covered by the tapering mandrel during the pre-expansion operation to be restricted, for example by means of a suitable abutment.

In an advantageous embodiment of the invention, during the operation of pre-expanding the end region of the blank, the blank may be under an increased internal pressure which may be produced by compressed air which is advantageously introduced into the blank through a passage provided for that purpose in the mandrel which is used to carry out the pre-expansion operation.

When using a mandrel which tapers in a substantial conical configuration towards its free end, for carrying out the pre-expansion operation, the end region of the blank is put into a substantially cup-shaped configuration, with the largest inside diameter of the pre-expanded region at the end of the blank being such that on the one hand the edge or rim portion of that region can be satisfactorily clamped while on the other hand the temperature-control mandrel for heating the blank can be introduced into the blank through the clamped edge or rim portion. In addition the configuration of the peripheral surface of the mandrel used for the pre-expansion operation may be such that the edge of the pre-expanded end region of the mandrel is bent over outwardly to a greater degree than the adjoining transition to the region of the wall portion of the blank which has not been subjected to pre-expansion, in order thereby to adapt the angular positioning of the edge or rim portion relative to the axis of the blank to the configuration and position of the clamping means, if appropriate, for holding the blank when the temperature-control mandrel is introduced thereinto.

In order to attain the thermal stability of the hollow body to be produced, which is the aim of the operation using the heating mandrel, it is necessary for the heating action required to be applied to the blank for that purpose to take place as uniformly as possible in order to avoid the occurrence of areas of different thermal stability in the hollow body to be produced. In addition, in order to achieve a high through-put capacity, the mandrel should be heated to the temperature required for the thermofixing operation as quickly as possible. For that reason, it is advantageous for the temperature-control mandrel to be of an outside diameter which is at least slightly larger than the inside diameter of the blank so that the blank experiences an at least slight expansion when the mandrel is introduced into the blank, thereby to achieve a uniform transfer of heat from the mandrel to the regions of the blank which are to be heated thereby. As long as the only point to be considered is that of achieving a good condition of contact between the mandrel and the wall portion of the blank, the expansion of the blank as the mandrel is introduced thereinto may be so slight that it does not markedly affect the physical properties of the blank or the hollow body to be produced therefrom.

On the other hand however it is also possible for the outside diameter of the mandrel to be substantially larger than the inside diameter of the wall portion of the blank when it has not been subjected to pre-expansion so that at least the region of the blank which has not been pre-expanded experiences a noticeable increase in its cross-section, in order to provide for orientation in the peripheral direction of the thermoplastic material forming same.

Whether the temperature-control mandrel is also used at the same time for increasing the diameter of the blank by such an amount that that increase in diameter also results in orientation of the material forming the wall portion of the blank, as already mentioned above, substantially depends on the manufacturing steps through which the blank has passed up to the heating operation or the pre-expansion operation which precedes the heating operation. If, in those preceding treatment steps, the material forming the wall portion of the blank has also already been oriented in the peripheral direction, then generally there is no need to increase the diameter of the blank by use of the temperature-control mandrel, for the purposes of producing orientation of the plastic material.

When using for example PETP, the blank thermofixing operation is normally effected at a temperature of not less than 150° C., in which respect the period for which the heat is applied to the blank at that temperature is such that crystallisation of the thermoplastic material occurs. When using other thermoplastic materials, it is possible to use other temperatures and other effects which produce the thermofixing action, for example stress relief.

In order to provide for cooling of the blank at the highest possible rate in order to attain stability in respect of shape of the blank after the conclusion of the thermofixing operation, it is advantageous, after the thermofixing operation has been effected, for the wall portion of the blank to be brought into contact with a surface which surrounds the wall portion on the outside thereof and which cools down the wall portion of the blank. In that operation, the diameter of the blank may be slightly increased to bring it into contact with the surrounding cooling surface, and that increase in diameter which is provided to give an enhanced cooling effect may be achieved by virtue of an increased pressure within the blank.

More specifically, the thermofixing operation and the increase in diameter of the wall portion of the blank, which may be involved therewith, for the purposes of orientation of the plastic material forming the wall portion of the blank, may be carried out by the pre-expanded blank firstly being centered and held between an axially displaceable holding mandrel which is introduced into the blank through the opening thereof until it bears against the bottom thereof, and an axially displaceable bottom mandrel which is moved towards the blank until it bears against the outside surface of the bottom thereof, whereupon a support sleeve which is disposed around the bottom mandrel and whose inside diameter substantially corresponds to the outside diameter of the blank in the non-pre-expanded region thereof is displaced upwardly into a position just below the pre-expanded end portion of the blank and a first clamping ring which is disposed around the support sleeve is displaced upwardly to clamp the pre-expanded free end portion of the blank between the first clamping ring and a second clamping ring which surrounds the holding mandrel which has been introduced into the blank from above, whereupon a hollow temperature-control mandrel which is arranged in coaxial relationship around the holding mandrel is introduced into the blank which is held by the clamping rings, through the opening in the blank, by a relative movement of the mandrel relative to the blank, with the outside peripheral surface of the mandrel bearing against the inside surface of the wall portion of the blank for thermofixing thereof, while at the same time the support sleeve is displaced downwardly substantially synchronously with the downward movement of the temperature-control mandrel until the latter had reached its limit position towards the bottom of the blank, whereupon a cooling sleeve which is arranged in coaxial relationship with the support sleeve and the bottom mandrel and whose inside diameter is slightly larger than the outside diameter of the blank which has been heated by the temperature-control mandrel and slightly expanded is pushed over the blank and thereupon compressed air is introduced into the blank so that the wall portion of the blank is lifted away from the mandrel and its outside peripheral surface is pressed against the inside peripheral surface of the cooling sleeve and is cooled down so that it attains adequate stability in respect of shape.

The clamping of the blank at its edge portion around the open end thereof, by the above-mentioned clamping means, is advantageously removed after the temperature-control mandrel has reached its limit position which is required for the heating operation, so that the pre-expanded edge portion of the blank, which co-operates with the clamping means, experiences a change in shape under the effect of ambient heat and thereafter takes up a position in which that edge portion extends parallel to the longitudinal axis of the blank. The time required for that purpose is no longer than the time required for the temperature-control or blank-heating operation. The advantage of that fresh change in shape of the end region of the blank, in which the latter normally contracts into its initial condition, with a possibly enlarged outer diameter, is that at the end of the treatment steps the blank is of a configuration in which no parts of the wall portion thereof project outwardly relative to the main wall region of the blank, for example to form a flange. That consideration makes it easier to transport the blanks, in which respect account must also be taken of the consideration that the blanks are articles which are to be produced and processed in very large numbers and which accordingly also have to be transported in large numbers.

It is desirable for the cooling sleeve to be pushed over the blank only when the thermofixing operation has been substantially terminated. As the cooling sleeve is at a substantially lower temperature than the temperature-control or heating mandrel, the presence of the sleeve during the heating operation would delay the increase in temperature of the blank to the temperature value required to achieve the necessary level of thermal stability, with the result that the throughput capacity of the equipment used for carrying out the operating procedure would be correspondingly reduced.

The amount of expansion of the blank, which is produced by the action of the pressure medium and which lifts the inside peripheral surface of the blank away from the surface of the temperature-control mandrel and brings the outside peripheral surface of the blank to bear against the inside peripheral surface of the cooling sleeve may be so slight that there is no need to take particular steps to close off relative to the exterior the space in which the internal pressure of the pressure medium takes effect, as long as the temperature-control mandrel projects into the opening of the blank. On the contrary, the flow resistance in regard to flow of the pressure medium in the annular clearance between the outside peripheral surface of the temperature-control mandrel and the inside surface of the blank which bears with its outside surface against the cooling sleeve is so high that an adequate pressure is maintained within the blank, as long as the pressure medium continues to be supplied to the space within the blank. It is desirable for the mandrel to be removed from the blank after the wall portion of the blank has come to lie against the inside surface of the cooling sleeve, under the effect of the increased pressure generated within the blank. That accelerates the cooling process as the blank ceases to be heated by the transfer of heat from the mandrel to the blank by radiation therebetween. However, in that connection operation is desirably such that the mandrel is firstly moved into an intermediate position in which it is only the end portion of the mandrel that extends into the blank to such an extent that the increased internal pressure in the blank is maintained for the remaining time of the cooling operation, by virtue of the above-mentioned flow resistance generated by the narrow gap between the outside surface of the blank and the inside surface of the mandrel. After the blank has sufficiently cooled down, the cooling sleeve is then moved into a position in which it is spaced away from the blank so that it thus releases the blank and the blank can be engaged by a holding means which acts on the blank on the outside thereof, whereupon the bottom mandrel is moved back from the blank and the holding mandrel is also moved out of the blank. At the same time the temperature-control mandrel may also be additionally moved away from the blank by a distance which is required for it to come out of a position of engagement with the blank.

When the blank has been mechanically expanded by the temperature-control mandrel to such a degree that the increase in the periphery of the blank results in orientation of the plastic material from which it is formed, it will generally be necessary for the holding mandrel, prior to expansion of the blank produced by insertion of the temperature-control mandrel thereinto, to be moved away from the bottom of the blank by a short distance which corresponds at least to the amount by which the length of the blank is reduced as a result of the increase produced in its diameter by the action of the temperature-control or heating mandrel. In that respect it may also be advantageous that, prior to expansion of the blank caused by introduction of the temperature-control or heating mandrel thereinto or in the course of the blank expansion operation, the bottom mandrel or support member is moved away from the bottom of the blank by a distance which corresponds at least to the extent of a temporary elastic increase in the length of the blank. That takes account of the fact that, in the operation of expanding the blank, the temperature-control mandrel applies considerable forces to the wall portion of the blank, which initially cause the material forming the wall portion of the blank to be elastically stretched, which results in a certain increase in the axial dimension or length of the blank. That however is essentially elastic deformation which reverses as soon as the temperature-control mandrel has reached its end portion in which its end face generally bears against the bottom portion of the mandrel. Any stress that may remain in the wall portion of the mandrel wound then in any case be removed under the effect of the temperature-control mandrel as it increases the temperature of the blank.

After the expansion operation has been concluded and advantageously during the operation of heating the blank, the holding mandrel and the bottom mandrel which have been referred to hereinbefore may be brought into contact with the bottom portion of the blank again, in such a way that they clamp the bottom portion of the blank between themselves and thus secure the blank in position until, after the termination of the blank cooling process, the blank is gripped by a holding means, for example the holding means of a transportation device for providing for further transportation of the blank. The fact that the bottom portion of the blank is gripped between the holding mandrel and the bottom mandrel takes account of the aspect that the bottom portion of the blank is normally the part thereof which enjoys the highest level of stability in respect of shape, as it is larger in thickness than the wall portion of the blank. Furthermore, holding the blank at the bottom portion thereof between the holding mandrel and the bottom mandrel gives the advantages that that holding action can already take place at a time at which the wall portion of the blank is still being subjected to some treatment operation, for example the cooling process, without the two operations, namely the for example cooling operation and the blank gripping operation, interferring with each other.

The apparatus according to the present invention, for carrying out the above-outlined process of the invention, for pre-expansion of the end portion of the blank, is provided with a heatable mandrel which tapers towards its free end, with its smallest cross-section being smaller than the cross-section of the end portion of the blank prior to being subjected to the pre-expansion operation, while the largest diameter of the mandrel is larger than the cross-section of the end portion which is to be pre-expanded, the portion of the mandrel which produces the pre-expansion effect being defined by a surface which extends in a linear or a concave configuration in longitudinal section. The last-mentioned feature takes account of the fact that the blank which is to be subjected to the pre-expansion operation by the tapering mandrel will generally be of a very thin wall gauge. The thickness of the wall portion of the blank may be in the region of a few tenths of a millimetre. In consequence, in particular the concave configuration of the operative portion of the mandrel, as referred to above, contributes to preventing any irregular deformation of the blank and in particular the formation of folds and the like therein.

On the other hand, to provide a centering effect when the tapering mandrel is introduced into the blank, in order thereby to align the blank and the mandrel relative to each other, it is advantageous for the mandrel, between the portion thereof which produces expansion of the blank and the free end portion, to be provided with a further portion whose outer wall surface extends in a slightly convex configuration in longitudinal section. That provides that the blank which does not need to have any special support on its outside during the pre-expansion operation is already aligned and thus centered with respect to the tapering mandrel at a relatively early stage in the operation of introducing the mandrel into the opening of the blank.

Further objects, features and advantages of the present invention will be apparent from the following description of a preferred embodiment thereof.

BRIEF DESCRIPTION OF THE DRAWINGS

FIG. 10 is a diagrammatic side view of a treatment station for thermofixing of the pre-expanded blank, FIGS. 11 through 17 are each a view corresponding to FIG. 8, illustrating respective positions of the blank-treatment means which co-operate therewith, in the course of the treatment operations carried out in the treatment station, FIGS. 15a and 15b each show a portion from FIG. 15 on a substantially enlarged scale prior to and subsequent to the blank having been expanded by an increased internal pressure therein.

DESCRIPTION OF THE PREFERRED EMBODIMENT

Figure 1:
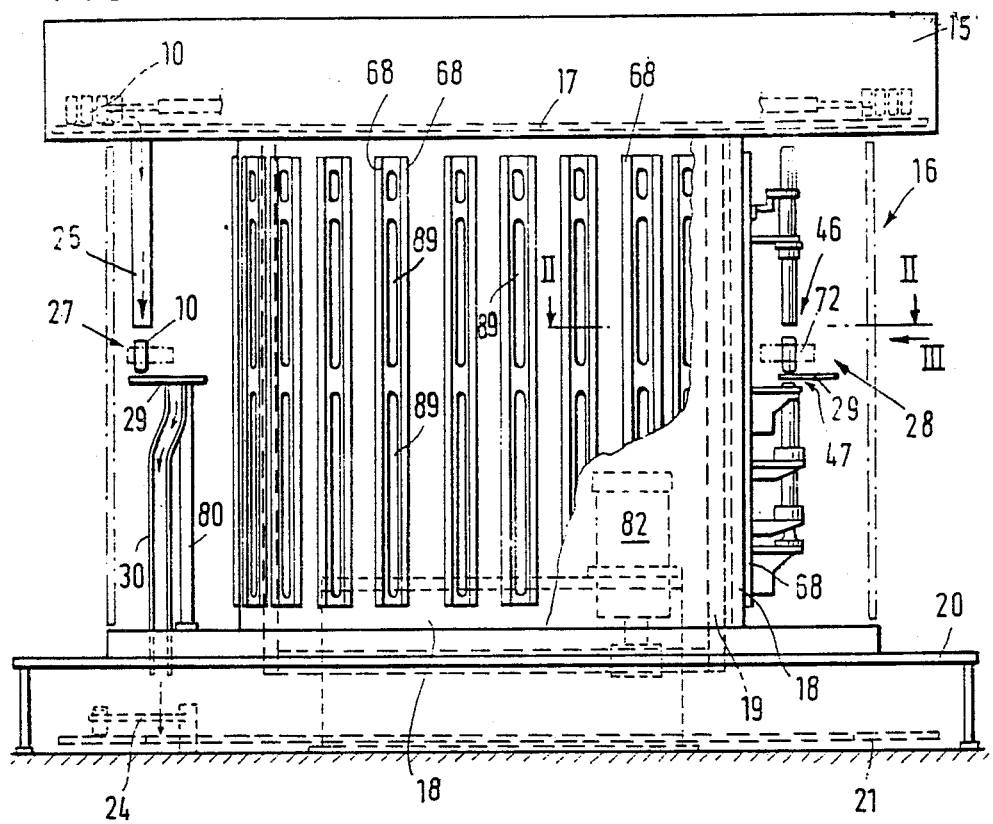
FIG. 1 is a diagrammatic side view of an apparatus having a plurality of stations of the same configuration for processing plastic blanks.
Figure 18:
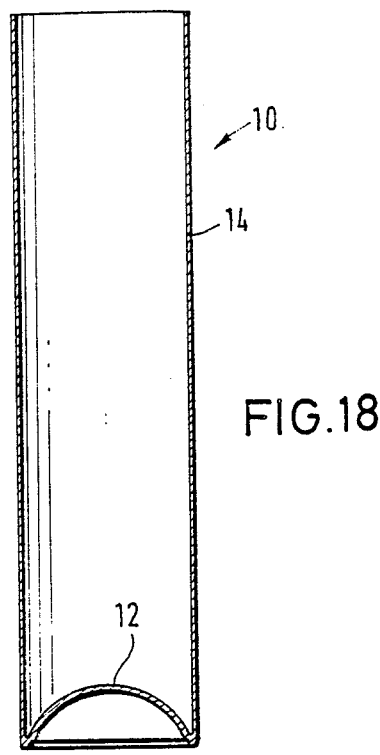
FIG. 18 is a side view of a blank prior to performing the treatment steps in accordance with the invention.

Referring firstly to FIG. 1, illustrated herein is the general configuration of an apparatus as indicated generally at 16, for treating or processing blanks which are of the configuration illustrated in FIG. 18. As shown therein, each blank 10 essentially comprises a par-spherical bottom or end portion 12 which extends inwardly of the blank, and a cylindrical wall portion 14, the free end of which, being the upper end in FIG. 18, defines an opening. The blank may be produced as an intermediate product from a preform using a drawing operation, as described for example from French laid-open application No. 2 567 066 (application No. 85 10215). The wall portion of the blank 10 is for example from 0.1 to 0.3 mm in thickness after the drawing operation. The bottom portion 12 of the blank is substantially thicker as it has not been affected by the drawing operation which is restricted to the wall portion 14. The drawing operation is generally carried out when the preform or the wall thereof is at a temperature which is below the vitreous transition temperature of the thermoplastic material of which it is formed. The wall portion 14 of a blank produced in the above-indicated manner is oriented in the axial direction by virtue of the drawing operation while there is not yet any orientation of the material in the peripheral direction, in the case of a blank 10 produced by the above-indicated mode of procedure.

Figure 2:
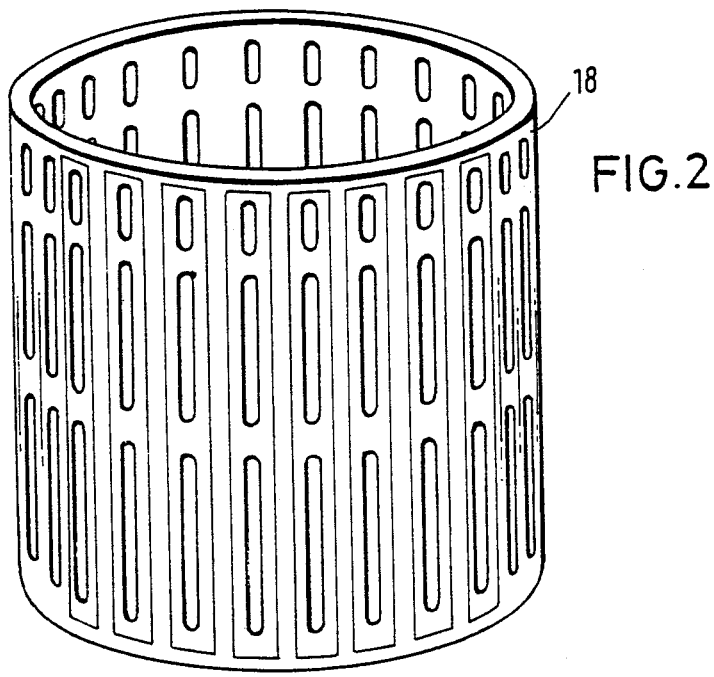
FIG. 2 is a diagrammatic perspective view of a housing of the apparatus shown in FIG. 1, without additional components.

For further processing in accordance with the teaching of the present invention, the blanks as indicated at 10 are delivered by way of a suitable conveyor apparatus (not shown) to the apparatus 16 illustrated in FIG. 1. In its upper region 15, the FIG. 1 apparatus 16 has an annular disc 17 which is arranged in a horizontal plane and which is rotatable about a vertical axis. The blanks 10 supplied to the apparatus 16 first pass on to the rotating disc 17 by means of which they are distributed around the entire periphery of the apparatus 16. Beneath the upper region 15, the apparatus 16 has a housing 18, as shown in FIG. 2, which is substantially cylindrical or polygonal in cross-section and which is arranged in coaxial relationship with the axis of rotation of the disc 17. in its lower part the housing 18 is surrounded by a substantially circular base 20 in which a second annular disc 21 is arranged coaxially with respect to the upper disc 17 and the stationary housing 18 and is rotatable therein.

Figure 3:
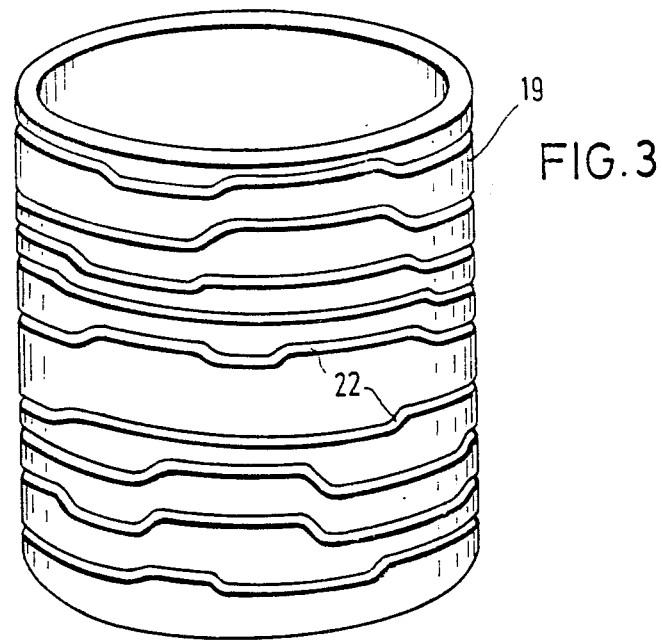
FIG. 3 is a diagrammatic perspective view of a cam-bearing drum for actuating at least some of the blank-processing means.

Arranged coaxially within the housing 18, for actuating at least some of the blank-treatment means, is a cam drum 19 which rotates about its longitudinal axis and which carries a plurality of cams 22 on its outside. The cam drum can be clearly seen from FIG. 3. The cams 22 on the cam drum co-operate with cam follower rollers 25 which are clearly visible in FIG. 4 and which are operatively connected to the blank-treatment means.

The treatment stations for treating the blanks are arranged around the stationary housing 16 on the outside thereof. The number of treatment stations depends on the amount of space that they each require and the diameter of the housing 18.

Each two treatment stations 27 and 28 through which each blank passes for the purposes of the treatment steps which are to be carried out thereon are combined together to form a respective treatment unit. All the treatment units of the apparatus 16 shown in FIG. 1 are of the same configuration so that the blanks are subjected to processing in the same manner in all the treatment units of the apparatus 16. For the sake of enhanced clarity of the drawing, FIG. 1 only illustrates one treatment station 27 at the left and only one treatment station 28 at the right. In actual fact, as can be seen in particular from FIG. 4, those stations are arranged in respective pairs.

Figure 9:
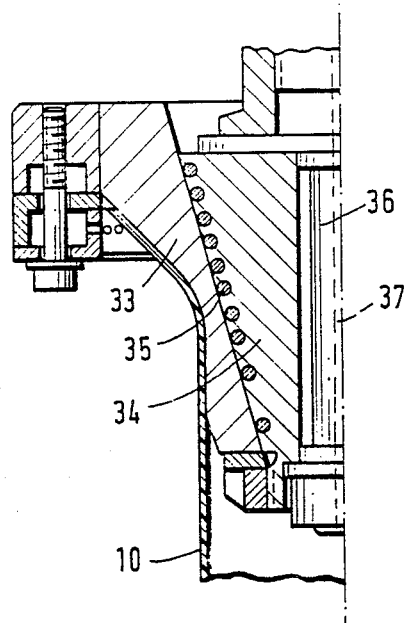
FIG. 9 shows a portion from FIG. 7 on an enlarged scale.
Figure 19:
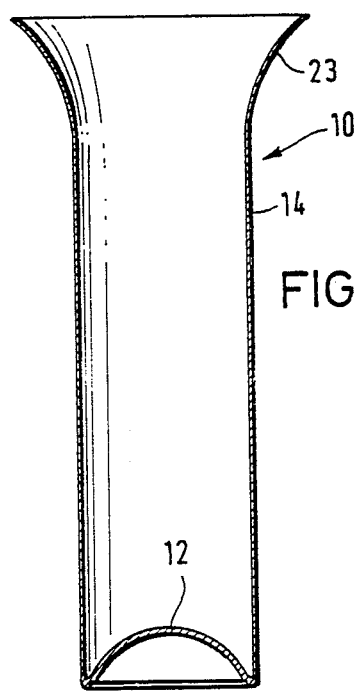
FIG. 19 is a side view of the pre-expanded blank as illustrated in FIGS. 5, 7 and 8.

The individual blanks 10 go from the upper disc 17 into a substantially vertically extending shaft 26 which is of an inside diameter that is adapted to the outside diameter of the blank 10. The shaft 26 through which the blank drops terminates at a position corresponding to about the mid-height location of the housing 18, laterally beside the first treatment station 27 of the treatment unit consisting of the first and second treatment stations 27 and 28. the blank 10 is pushed out of the shaft 26 into the first treatment station 27 in which it is subjected to pre-expansion. After the pre-expansion operation has been concluded, the blank 10 is of the configuration shown in FIGS. 9 and 19, with its upper end portion as indicated at 23 having been expanded in a cuplike shape.

From the treatment station 27, the blank 10 is then moved into the second treatment station which is disposed therebeside and in which it is subjected to a further treatment operation which, in the embodiment described hereinafter, is a mechanical expansion operation which is followed by a thermofixing operation for putting the expanded blank into a thermally stable condition. In the mechanical expansion operation the wall portion 14 of the blank, starting from the pre-expanded end portion 23, is enlarged to a substantially larger diameter in order to provide for peripheral orientation of the material forming the wall portion 14, apart perhaps from the outermost edge of the pre-expanded region 23.

Figure 20:
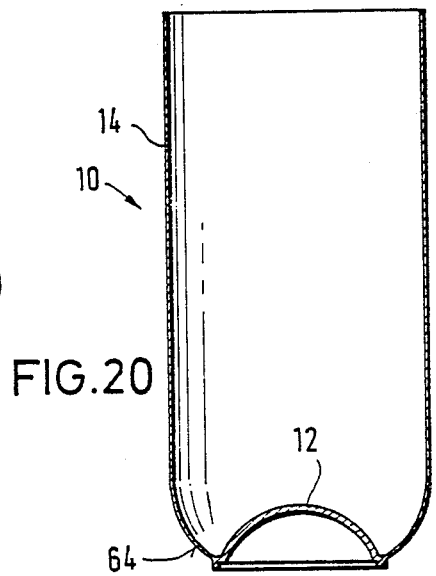
FIG. 20 is a side view of the thermofixed blank which has been expanded to provide for orientation of the plastic material forming the wall portion thereof, after the treatment steps in accordance with the present invention have been carried out.

After the treatment operations have been performed in the second station 28, the blank 10 is of the configuration shown in FIG. 20, with the bottom portion 12 having remained unaltered and the wall portion 14 having been expanded to a considerable extent, which also results in the length of the blank having been shortened.

The article produced in that way which is an intermediate product but which may also be in the final product is transported out of the second treatment station 28 by a substantially horizontal transportation movement into a position above the upper opening of a second conveyor shaft 30 which is illustrated by way of example at the left in FIG. 1, and then released so that it drops through the shaft 30 downwardly into the region of a lower annular disc 21. A pusher member as indicated at 24 or a like device is provided to move the blank from its position beneath the lower end of the lower shaft 30 on the lower disc 21 which moves it to a subsequent conveyor apparatus for delivering the article produced in the apparatus 16 to a subsequent treatment station or for example to a collecting container.

Figure 4:
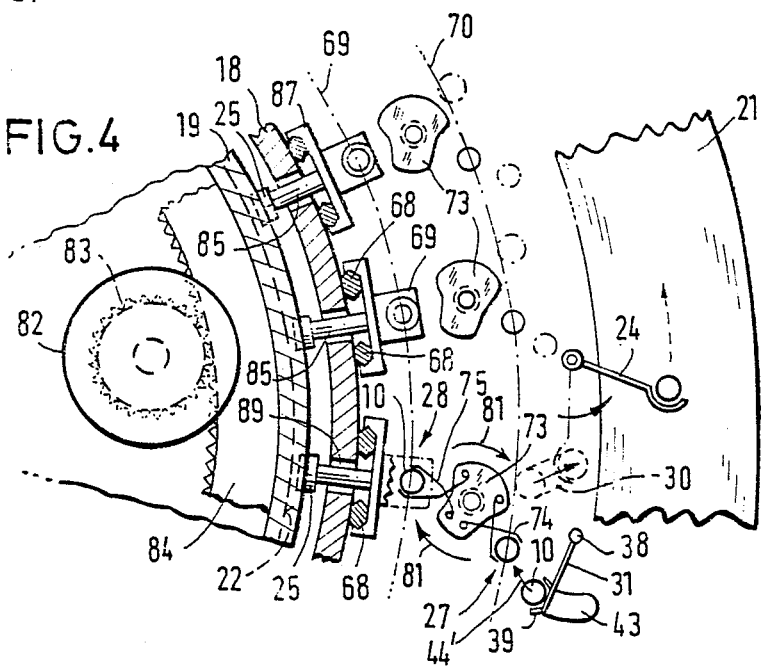
FIG. 4 is a view in the direction of the arrow II—II in FIG. 1.
Figure 5:
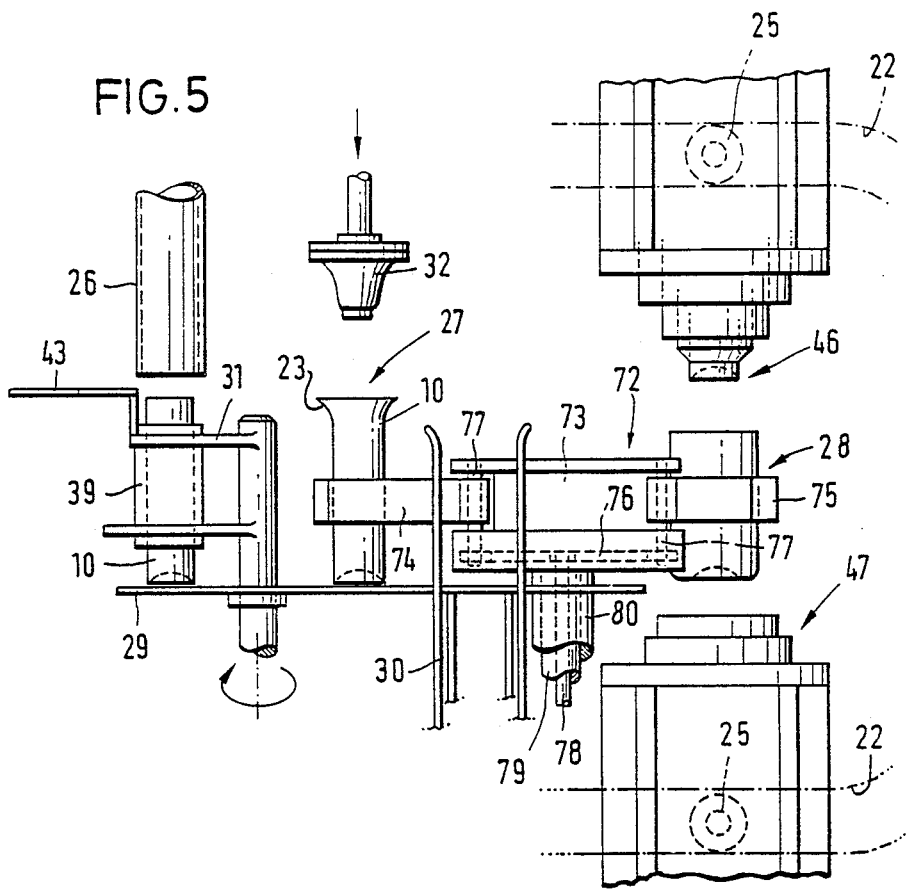
FIG. 5 is a diagrammatic view of a treatment unit consisting of first and second treatment stations, viewing in the direction indicated by the arrow II—II in FIG. 1.

Reference will now be made in particular to FIG. 5 showing that the upper conveyor shaft 26 of each treatment unit opens beside the first treatment station 27, more specifically at the side of the first treatment station 27 which is remote from the second treatment station 28. A bottom plate 29 is arranged beneath the free end of the shaft 26 at a spacing therefrom which is somewhat greater than the respective maximum length of the blank 10. Arranged between the region beneath the shaft 26 and the first treatment station 27 is a transport arm 31 which can be pivoted with a reciprocating movement about a vertical axis as indicated at 38 in FIG. 4. Mounted to the arm 31 adjacent the free end thereof is a receiving device 39 which is open at one side and which is otherwise adapted to the respective cross-sectional shape of the blank. The arm 31 is further provided with a projection portion 43 which extends substantially in a horizontal plane and which is disposed at a small vertical spacing from the lower end of the shaft 26. That structure can also be seen from FIG. 5, as well as the plan view view in FIG. 4.

The arm 31 is pivotable between first and second limit positions, FIGS. 4 and 5 showing that position in which the receiving device 39 for accommodating the blank 10 is disposed beneath the end of the shaft 26 in alignment therewith so that a blank which falls downwardly from the shaft 26 is necessarily accommodated in the receiving device 39 when the blank arrives at the bottom plate 29. The arm 31 is pivoted in the direction indicated by the arrow 44 in FIG. 4, into its other limit position. That limit position corresponds to the axial position of the blank in the first treatment station 27. In the course of the pivotal movement in the direction indicated by the arrow 44, the projection 43 is moved into a position in which its end region remote from the receiving device or holder 39 is disposed just as the lower end of the shaft 26 so that, when the holder or receiving device 39 on the arm 31 is in the first treatment station 27, a blank 10 which drops down through the shaft 26 firstly encounters the projection 43 which is of a slightly curved configuration, corresponding to the pivotal movement performed by the arm 31 and the radius of the arm. In the course of the return movement of the arm 31 into its left-hand limit position as shown for example in FIG. 4, the projection 43 is moved out of the region beneath the shaft 26, in the last phase of the return movement, so that the blank which is supported on the projection 43 and which cannot participate in the movement thereof as the major part of the length of the blank is still contained in the shaft 26 falls downwardly on to the bottom plate 29 and into the holder device 39. In the next pivotal movement of the arm 31 in the direction indicated by the arrow 44' in FIG. 4, the blank will then be pushed into the first treatment station 27.

FIGS. 4 and 5 more particularly show that the two stations 27 and 28 of each treatment unit are positioned in different ways relative to the housing 18. The second stations 289 in all treatment units are at least directly connected to the housing in such a way that guide bars 68 for guiding the tools are fixed to the housing so that the latter also carries the reaction forces resulting from the forces which are applied in the respective second treatment stations 28 by the tools for carrying out the treatment operations on the blanks. The respective first stations 27 of all treatment units are displaced somewhat outwardly relative to the associated second treatment stations 82 so that they are at a greater radial distance from the longitudinal axis of the housing 18 than the respective second stations 28. In that connection the arrangement is such that all first stations 27 on the one hand and all second stations 28 on the other hand are arranged on respective common circles 69 and 70, in coaxial relationship with the housing 18, and the circle 70 on which the first stations 27 are disposed is of larger diameter than the circle 69 on which the second stations 28 of all treatment units are disposed. The above-described arrangement makes it possible to provide a larger number of stations per housing than when both stations of a respective treatment unit are arranged directly on the housing 18, that is to say for example on the circle 69 shown in FIG. 4. Moreover, the above-described relative arrangement in respect of the first and second stations 27 and 82 of a respective treatment unit also facilitates transportation of the blanks within the treatment unit from one station to another, as the transportation movement does not need to be along the periphery of the housing 16, thus providing a higher degree of flexibility in regard to the transportation means and the transportation paths to be followed.

Associated with each treatment unit consisting of the first and second stations 27 and 28 is a transport device 72 comprising a block 73 which is pivotable about a vertical axis and which carries first and second grippers 74 and 75, the two parts of each of which are mounted on the block 73 pivotably in a horizontal plane for performing closing and opening movements. The drive for the opening and closing movements is transmitted to the gripper members by way of connecting elements 76 and 77. The drive for the pivotal movement of the block 73 is produced by way of a tube portion 79 which is in coaxial relationship with the connecting element 78 and which is fixedly connected to the block 73. The two connecting members 78 and 79 are suitably connected to respective cams 22 on the cam-bearing drum 19.

The two connecting members 78 and 79 are surrounded by a stationary tube portion 80 which is coaxial with respect thereto and which, as also shown in FIG. 1, is supported on the base 20 of the apparatus. The tube portion 80 carries the bottom plate 29 and possibly further components in the respective first station. In the position of the components as shown in FIGS. 4 and 5, the gripper 74 is in the first treatment station 27 and the gripper 75 is in the second treatment station 28.

Arranged in the first treatment station 27 is a mandrel 32 which is shown in FIGS. 5 through 9 but which is not illustrated in FIGS. 1 and 4. The mandrel 32 can be moved up and down provides for pre-expansion of the upper end region 23 of the blank 10 so that subsequent to the pre-expansion operation the blank 10 is of the configuration shown for example in FIGS. 8 and 19. The mandrel 32 essentially comprise an outer casing portion 33 and an inner core portion 34, as shown for example in FIG. 6 and also more particularly in FIG. 9. The portions 33 and 34 are arranged in coaxial relationship. On its outside the core 34 is provided with at least one groove extending in a spiral configuration in which a wire 35 is laid, acting as an electrical heating resistance for heating the outer portion 33. An axial pin member 36 which carries the core portion 34 and the outer portion 33 has a central duct 37 extending longitudinal therein, for introducing compressed air into the blank 10 during the shaping operation which is to be carried out in the station 27, in order thereby to generate within the blank 10 an increased pressure for supporting the wall portion of the blank 10.

The mandrel 32 which taper towards its free end is of a concave configuration in longitudinal section in the region of its outer boundary surface which comes into contact with the wall portion of the blank 10 in the operation of shaping the end region 23 thereof, but it may also be linear.

Figure 6:
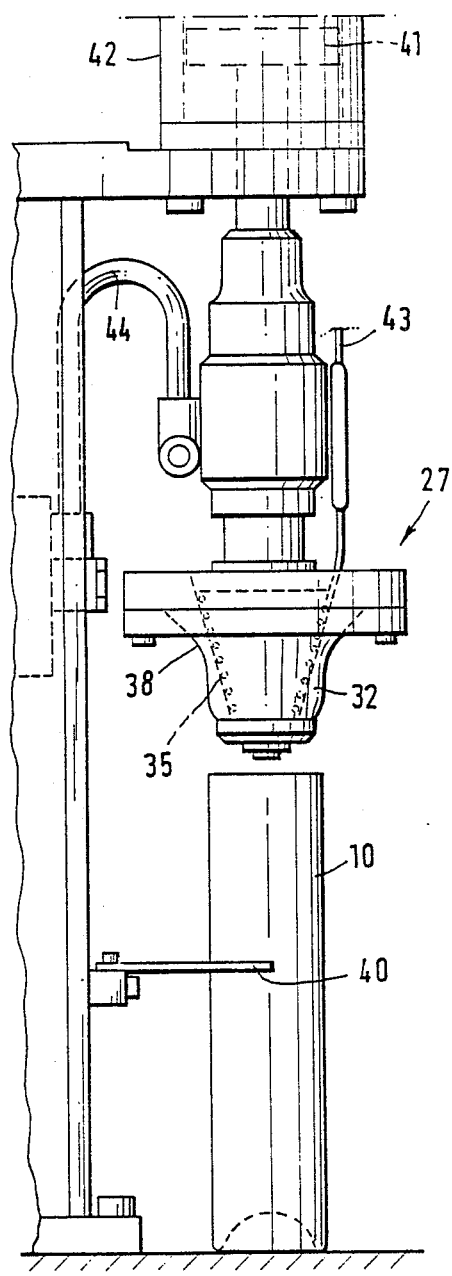
FIG. 6 is a diagrammatic side view of a treatment station for pre-expansion of a blank with the pre-expansion tool in the starting position thereof.

The blank 10 which passes into the first treatment station 27 through the upper shaft 26 and thereafter by means of the arm 312 is only aligned in that station relative to the mandrel 32 by a fork 40 which is shown in for example FIGS. 6 an d7. The mandrel 32 is then moved from its starting position shown in FIG. 6 downwardly into the blank 10 through the upwardly open opening of the blank 10. The diameter of the mandrel 32 at its free end is smaller than the diameter of the opening of the blank 10. In the course of the downward movement of the mandrel 32, the blank 10 is first subjected to a fine orientation or centralising effect so that it is arranged in precise coaxial relationship with the mandrel 32. That centering action in the first phase of the downward movement of the mandrel 32 involves scarcely any axial forces acting on the blank 10 which, as already mentioned, is of very small wall thickness. Then, in the course of the further downward movement of the mandrel 32, the concave portion 38 thereof (see for example FIGS. 6 and 9) comes into contact with the upper end portion 23 of the blank. As the mandrel 32 is heated by the electrical heating resistance wire 35 to a temperature which is suitable for softening the thermoplastic material of the blank, the thermoplastic material also experiences a corresponding rise in temperature virtually as soon as it come into contact with the mandrel. That results in softening of the material in the end region 23 of the blank, which can be shaped or deformed in that condition, by applying relatively low forces. In order in any event to ensure that the movement of the mandrel 32 downwardly into the blank 10 and the degree of heating of the end portion 23 of the blank 10 are suitably matched to each other in such a way that the mandrel 32 is only advanced into the blank 10 in accordance with the degree of heating thereof and the resulting deformability of the end portion 23, the mandrel 32 is carried by a piston 41 which is slidably within a pneumatic cylinder 42 and which is actuated towards the blank 10, as shown more particularly in FIG. 6. That arrangement permits precise control over the forces acting on the end portion 23 of the blank 10, in which respect the pressure applied by actuation of the piston 41 can be readily adjusted in such a way that the resulting force produced by the mandrel 32 on the blank 10 is on the one hand sufficiently high to shape the softened edge region 23 of the blank 10 while on the other hand being too low to cause undesired deformation of the blank 10, in particular also in the pa thereof which has not been exposed to the heating effect. In that connection the point that the interior of the blank 10 is supplied with compressed air through the duct 37 to produce an increased internal pressure in the blank plays an important part as the internal pressure performs a support function and in particular prevents the relatively slender blank 10 from buckling under the effect of the forces applied by the mandrel 32. In that connection the concave shape of the portion 38 of the mandrel 32 is also a matter of significance as in the area of contact between the mandrel 32 and the edge portion 23 of the blank which is to be deformed, the concave shape of the mandrel portion 32 transmits forces whose radial component predominates over the axial component and thus promotes the expansion procedure.

The electrical heating resistance wire 35 is connected to a voltage source by way of a line 43 while the compressed air is supplied by way of a hose 44.

Although, in the course of its downward movement into the blank 10 for the purposes of shaping the edge portion 23 thereof, the mandrel 32 is not controlled by a positively governed drive arrangement, the distance covered by the mandrel 32 to shape the edge portion 23 of the blank is restricted in some suitable fashion, for example by means of an abutment. That ensures that the operation of shaping the end portion 23 of each blank 10 takes place in the same manner, assuming that there is the necessary minimum time required for that purpose, which is essentially determined by the rate at which the end portion 23 of the blank softens under the effect of the heating action.

After treatment of the blank 10 in the first treatment station 27 has been concluded the pre-expanded blank 10 is moved into the second treatment station 28. For that purpose, the block 73 which can be clearly seen from FIGS. 4 and 5 is pivoted about its vertical axis in the direction indicated by the arrow 81 after the gripper 47 has been closed around the blank in the station 27 and the gripper 75 has been closed around the blank in the station 28. In the course of the pivotal movement of the member 73 in the direction indicated by the arrow 81 the pre-expanded blank is transported from the first station 27 into the second station 28. At the same time the blank in the second station 28 is moved by the second gripper 75 into a position in which that blank is disposed closely above the upward opening of the lower conveyor shaft 30 which for example comprises a plurality of spaced-apart bars or wires. After having reached their respective limit positions, the two grippers 74 and 75 are opened so that the blank carried by the gripper 74 is released in the station 28 and the blank carried by the gripper 75 is released above the lower conveyor shaft 30. With the components in that position, the arm 31 is pivoted at the same time into the right-hand limit position, entraining the next blank which is carried in the holder device 39 thereof. Thus after the return movement in the opposite direction to that indicated by the arrow 81, into the starting position as shown in FIGS. 4 and 5, the gripper 74 has the next blank in the station 27 and the gripper 75 has the next blank in the station 28. The operating procedure is generally such that the two grippers 74 and 75 are only closed after the treatment operations on the blanks in the two stations 27 and 82 are concluded.

Figure 7:
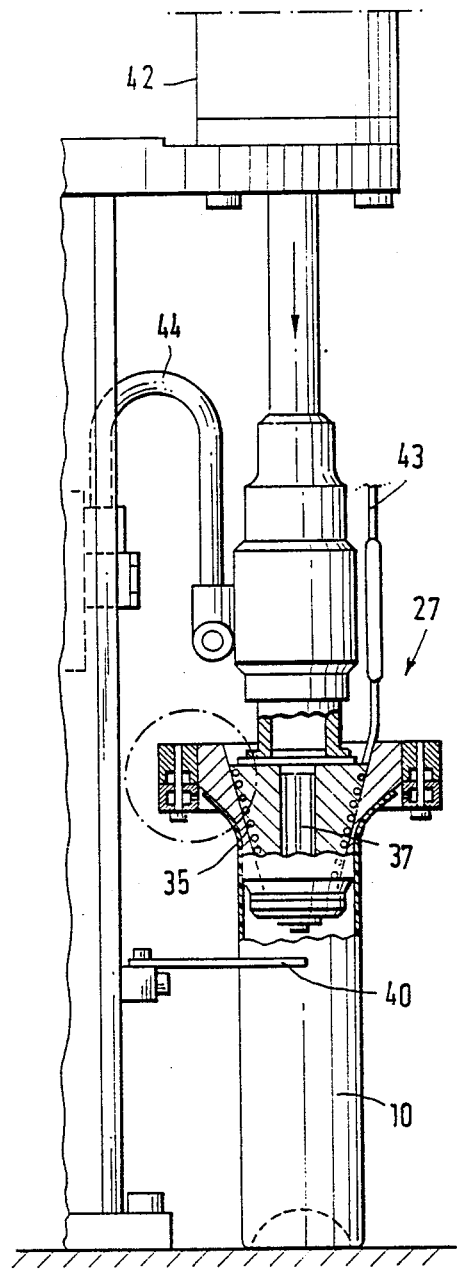
FIG. 7 is a view corresponding to that shown in FIG. 6, illustrating the pre-expansion tool in the end position thereof.

The particular configuration of the holder arrangement 40 in the form of a fork member, in the treatment station 27, as shown for example in FIGS. 6 and 7, is advantageously of such a nature that the prong of the fork 40 which is behind the blank 10 as looking at FIG. 6 is shorter than the prong of the fork which is on the side of the blank 40 which is towards the viewer of FIG. 6, so that the blank 10 can be easily pushed into the fork holder 40 by the gripper and easily removed therefrom again.

Treatment of the blank in the second station 28 takes place simultaneously with treatment of the following blank in the first station 27.

Referring now to FIGS. 10 and 11, disposed in the station 28 are two groups of means or tools for carrying out treatment operations on a blank 10. The means or tools fall into an upper group 46 and a lower group 47. All the means or tools of the upper group 46 are in a position above the upper pre-expanded end portion of the blank 10, in their starting position as shown in FIG. 10, while all the means or tools of the lower group 47 are disposed, in their starting position shown in FIG. 10, beneath the blank 10 which at that time is still held by the gripper 74 of the conveyor means 72.

The lower group 47 comprises a bottom mandrel 50, a support sleeve 51 which is disposed around the bottom mandrel 50, a cooling sleeve 52 which is disposed around the support sleeve 51, and a movable clamping ring 53 around the cooling sleeve 52. All those components 50 through 53 are mounted axially displaceably independently of each other.

The upper group 46 comprises a holding mandrel 55, a temperature-control or heating mandrel 56 around the holding mandrel 55, and a second stationary clamping ring 57 which is disposed around the mandrel 56. The holding mandrel 55 has an axial bore 58 therethrough. The holding mandrel 55 and the mandrel 56 are arranged to be axially displaceable independently of each other.

After the blank 10 has been moved into the position shown in FIG. 10, while the blank 10 is still being held by the gripper 74 the bottom mandrel 50 is moved upwardly until it bears against the inwardly extended bottom portion 12 of the blank and the holding mandrel 55 is displaced downwardly into the interior of the blank 10. The end face 60 of the bottom mandrel 50 matches the shape of the bottom portion 12 so that, when the bottom mandrel 50 lies against the outside surface of the bottom portion 12, there is a positive connection or interengagement between the bottom portion 12 and the bottom mandrel 50 which holds the blank 10 in such a way that it cannot shift laterally. The outside diameter of the holding mandrel 55 is only slightly smaller than the inside diameter of the blank 10 in the region thereof which has not been subjected to pre-expansion so that the holding mandrel 55 can be introduced into the blank until it bears against the inside surface of the bottom portion 12, without involving any real difficulty and in particular also without applying forces to the blank 10. The end face 61 of the holding mandrel 55 is also adapted to the shape of the bottom portion 12 so that, in the final position of the bottom mandrel 50 and the holding mandrel 55, the bottom portion 12 is clamped between the end faces 60 and 61 thereof. As the bottom portion 12 of the blank is normally of substantially greater thickness and is therefore substantially stiffer and more rigid than the wall portion of the blank 10, the bottom mandrel 50 and the holding mandrel 55 can be brought firmly to bear against the bottom portion 12 of the blank without any fear of causing unacceptable deformation of the bottom portion 12. That ensure that the mandrel 10 is properly and securely positioned by the bottom mandrel 50 and the holding mandrel 55. FIG. 11 shows the final position of the two member 50 and 55 with the gripper 75 already in an open condition.

The other part of the lower group 47, that is to say, the support sleeve 51, the cooling sleeve 52 and the movable clamping ring 55 also participate in the upward movement of the bottom mandrel 50 until it comes to bear against the bottom portion 12 of the blank 10, so that the components 51, 52 and 53 can be moved as a combined unit from the position shown in FIG. 10 into the position shown in FIG. 11, although each of those components has associated therewith its own drive arrangement including a cam follower roller co-operating with a cam on the cam drum.

Figures 12, 13:
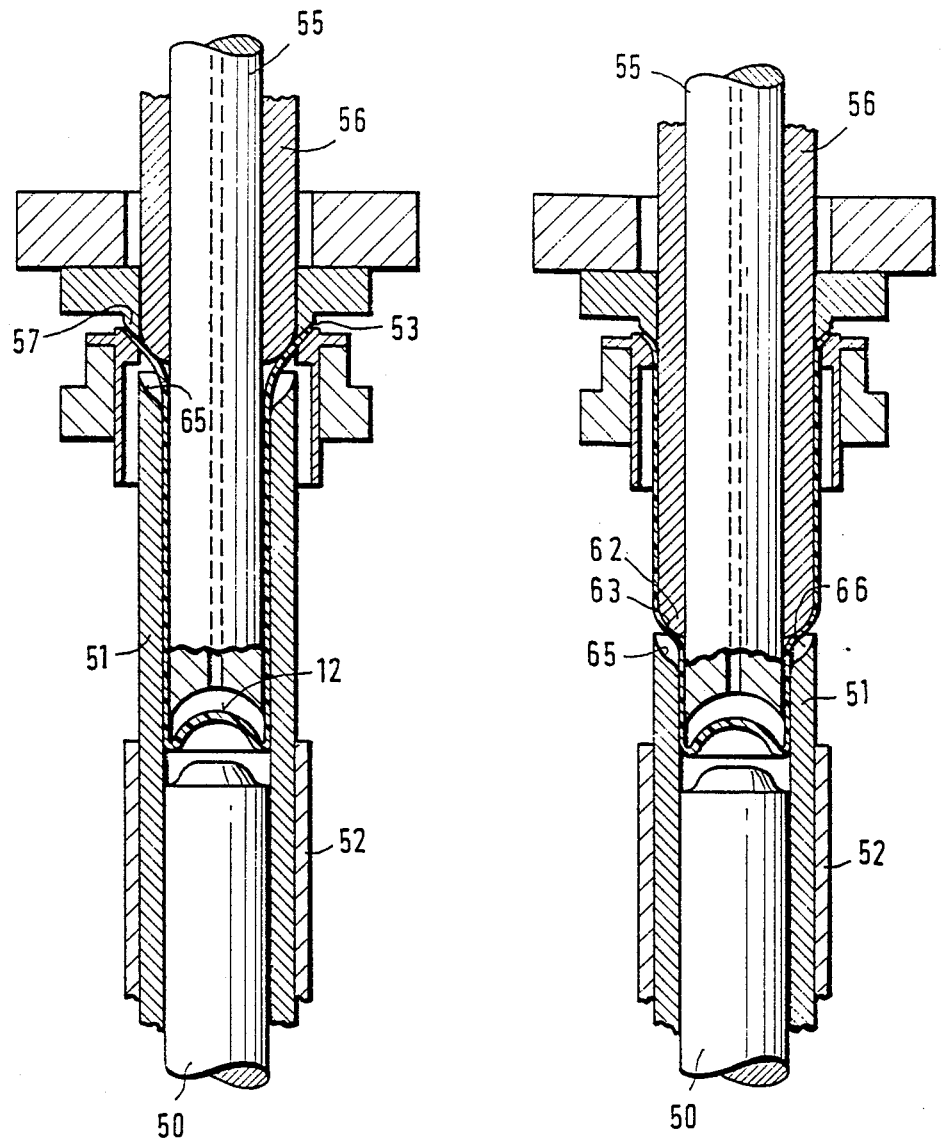

After the position shown in FIG. 11 has been reached, the bottom mandrel 50 and the holding mandrel 55 are moved synchronously upwardly, simultaneously entraining the blank 10 therewith, until the free edge of the pre-expanded end portion 23 of the blank comes to bear against the upper stationary clamping ring 57. The lower movable clamping ring 53 is then moved upwardly until it bears against the free edge of the end portion 23 so that that free edge is clamped between the two rings 57 and 53. FIGS. 12 and 13 show the structure in that position. At the same time or shortly thereafter, the support sleeve 51 is displaced upwardly, the inside diameter of the support sleeve 51 corresponding to the outside diameter of the blank 10 in the part thereof which has not been subjected to the pre-expansion operation. The upper limit position of the support sleeve 51 is shown in FIG. 12. The support sleeve 51 is disposed at a short distance from the lower end of the heating mandrel 56 which is still occupying its upper starting position in FIG. 12 and whose free end extends into the pre-expanded end portion of the blank 10, after the blank 10 has been displaced upwardly into an appropriate position by the above-mentioned joint upward movement of the bottom mandrel 50 and the holding mandrel 55.

In the following step in the procedure, the mandrel 45 whose outside diameter in the illustrated embodiment is substantially larger than the inside diameter of the blank 10 in the part thereof which has not been subjected to pre-expansion is introduced into the blank 10. At the same time the support sleeve 51 which surrounds the blank 10 on the outside thereof is moved back downwardly, advantageously at the same speed. It should be noted in that respect that the lower end portion 62 of the mandrel 56 is of a tapering configuration towards its end in such a way that the end portion 62 is delimited on its outside by a surface 63 which is operable to shape transitional portion 64 in the finished hollow body body between the bottom portion 12 and the wall portion 14 thereof, as shown in FIG. 20. The end of the support sleeve 51 is defined by a concave surface indicated at 65 for example in FIG. 12 in such a way that the end face 65 forms a kind of funnel-shaped guide means for the wall portion 14 of the blank 10, which is enlarged under the effect of the mandrel 56 as it penetrates into the blank 10. FIG. 13 shows in particular that, during the expansion operation, that is to say during the downward movement of the mandrel 56 and the support sleeve 51, which takes place substantially synchronously, the rounded face 63 at the end of the mandrel 56 on the one hand and the funnel-shaped face 65 on the support sleeve 51 on the other hand define a narrow gap as indicated at 66 in FIG. 13 which receives that part of the wall portion 15 of the blank which is subjected to the expansion effect in the course of the movement of the mandrel 56 and the support sleeve 51. The gap 66 is on the one hand sufficiently large to prevent the wall portion of the blank which is subjected to the expansion operation being clamped between the end portion 62 of the mandrel 56 and the end face 65 of the support sleeve 51, but on the other hand it is sufficiently narrow that the wall portion of the blank 10 which is subjected to the expansion procedure experiences a certain guidance effect. In particular the downward movement of the support sleeve 51, which is synchronous with the movement of the mandrel 56, ensures that that part of the wall portion 14 of the blank 10, which is still between the end portion 62 of the mandrel 56 and the bottom portion 12 of the blank 10, does not begin to expand uncontrolledly under the effect of the mandrel 56. In other words, the expansion operation takes place in a uniform fashion and in a controlled procedure over the entire length of the blank.

Prior to the beginning of the expansion operation, the holding mandrel 55 and the bottom mandrel 50 are each moved axially away from the bottom portion 12 of the blank by a small distance. The fact that the holding mandrel 55 is moved away from the bottom portion 12 takes account of the point that the blank 10 may experience a certain shortening in its length, in the course of the following expansion operation due to the introduction of the mandrel 56 into the blank. The bottom mandrel 50 is moved away from the bottom portion 12 of the blank for the reason that the introduction of the mandrel 56 into the blank 10 results, particularly in the initial phase, in a slight increase in the length of the blank 10 due to the axial forces applied to the blank 10 by the mandrel 56. That axial elastic stretching effect in respect of the blank 10 is not compensated, at any event in the initial phase of the expansion operation, by a corresponding axial reduction in the length of the blank due to the increase in the diameter of the wall portion 14 in the transitional region 64 (identified in FIG. 20) to the bottom portion 12.

Figures 14, 15, 15A, 15B:
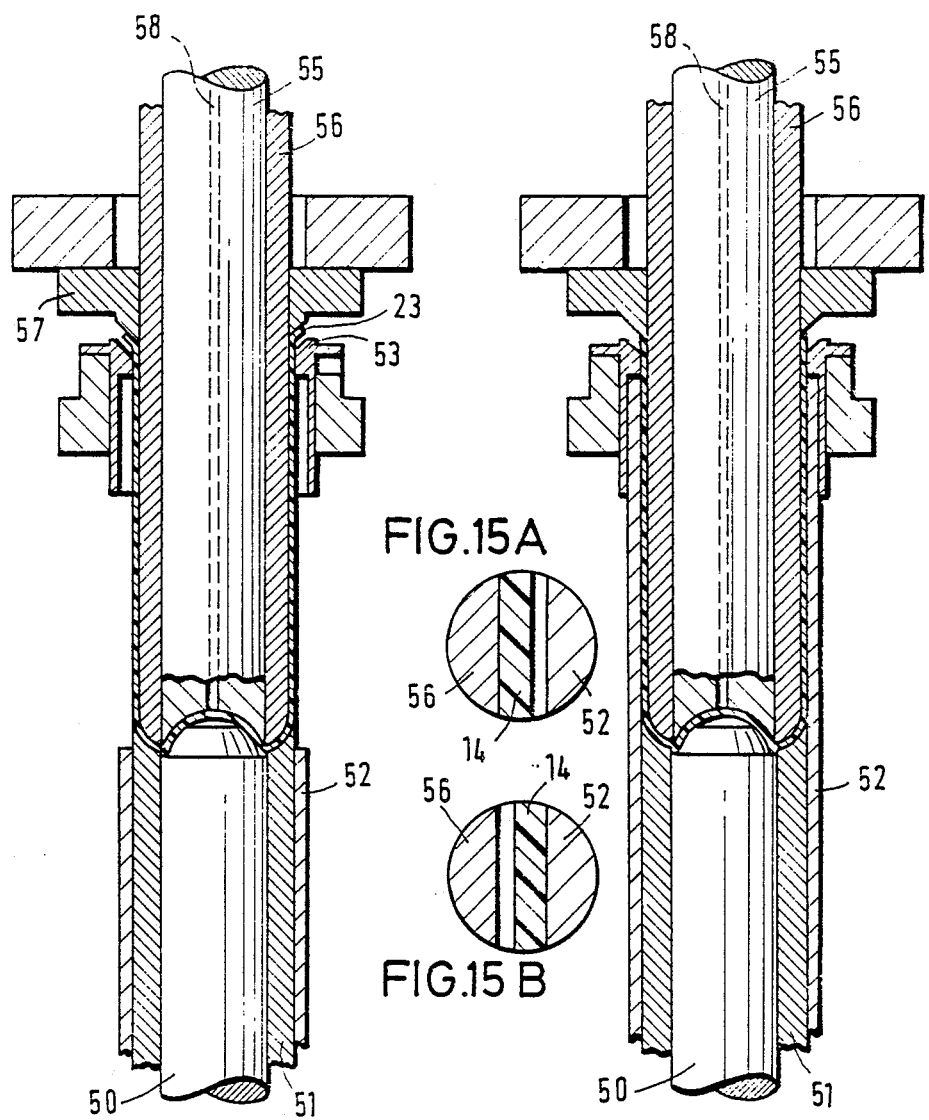

Reference will now be made to FIG. 14 showing the position of the apparatus structure at the end of the expansion operation. The blank 10 is of the configuration shown in FIG. 20, apart from its clamped edge portion. The bottom portion 12 has remained unaffected by the expansion operation. Adjoining the bottom portion 12 is the above-mentioned transitional portion 64 forming the transition between the bottom portion 12 and the major part of the wall portion 14 which extends parallel to the longitudinal axis of the hollow body produced, as can be clearly seen from FIG. 20. In the transitional portion 64 the blank has experienced an expansion effect, the extent of which decreases in accordance with the decreasing diameter towards the bottom portion 12.

The expansion operation which is performed with the blank 10 at a temperature which is at any event below the temperature at which the material of the blank experiences plasticization causes molecular orientation of the material of the wall portion 14 of the blank in the peripheral direction, with a corresponding improvement in the mechanical properties of the material forming the wall portion, in particular in regard to its tensile strength in the peripheral direction. However such orientation of the material also means that it shrinks, that is to say it undergoes a reduction in its dimensions, for example a reduction in its circumference and therewith its diameter, if the oriented material is heated again to a given temperature. For that reason it is necessary to subject the hollow body produced from the blank 10 by the above-described operating procedure to a thermofixing operation, that it to say, a heat treatment at a given temperature, which serves to stabilise the hollow body with the result that when the hollow body is subsequently subjected to the effect of heat at a temperature below the temperature at which the thermofixing effect took place, the hollow body does not suffer from any substantial shrinkage. That means that the temperature used for the thermofixing operation must be so selected that it is higher than the temperature to which the hollow body produced in the above-described manner may be subsequently exposed in normal use thereof. In the case of PETP for example, such a thermofixing action is achieved by causing at least partial crystallization off the material by virtue of the heat treatment.

Reference will now be made to FIG. 14 which, as indicated above, represents the position of the mandrel 56 after the termination of the expansion operation. The mandrel 56 remains in that position for a period of time which is necessary to give the desired thermofixing effect. At the same time the holding mandrel 55 and the bottom mandrel 50 are brought into contact with the bottom portion 12 of the expanded blank again. In addition, after the end of the expansion operation, the movable clamping ring 53 is displaced by a short distance so that the edge of the blank is released. Due to the internal stress in the region of the edge portion 23 of the blank which had been clamped and because of the temperature thereof, it experiences re-orientation to the diameter of the mandrel 56 so that the edge portion 23 again comes to bear from below against the mandrel 56 in axial parallel relationship therewith. When that occurs, there may also be an axial shortening effect at the same time. The resulting hollow body is thus of a configuration as shown in FIG. 20. After the termination of the thermofixing operation the cooling sleeve 52 is moved from its starting position as shown in FIG. 14 upwardly into its operative position as shown in FIG. 15 in which the cooling sleeve 52 is disposed around the blank 10 in its entire lengthwise extent, apart from its upper edge portion. After the cooling sleeve 52 has reached its upper limit position, compressed air is introduced into the thermofixed blank through the axial duct 58 in the holding mandrel 55 so that the blank is expanded somewhat and its outside peripheral surface comes to bear against the inside peripheral surface of the cooling sleeve 52. FIG. 15A shows the position of the structure prior to the introduction of compressed air into the blank 10 while FIG. 15B shows the condition after compressed air has been introduced into the blank 10. FIG. 15A shows in particular that the outside diameter of the blank, before the introduction of compressed air into the interior thereof, is slightly smaller than the inside diameter of the cooling sleeve 52. However that difference in diameters is very slight and is only sufficient to permit the cooling sleeve 52 to be moved easily over the mold when it is displaced upwardly, while on the other hand ensuring that the wall portion 14 of the blank is satisfactorily lifted away from the outside peripheral surface of the mandrel 56 under the influence of the increased internal pressure produced in the interior of the blank 10 by the feed of compressed air. The feed of compressed air and the movement of the wall portion 14 away from the mandrel 56, as a result of the increased internal pressure, and the application of the outside peripheral surface of the wall portion 14 against the inside peripheral surface of the cooling sleeve 52 which also occurs due to the increased internal pressure, take place at a time which is such that the duration of the preceding contact between the mandrel 56 and the blank was of sufficient length to ensure the desired thermofixing effect in respect of the material forming the wall portion of the blank 10.

Advantageously directly after expansion of the blank 10 which causes the wall portion thereof to be lifted away from the mandrel 56, the mandrel 56 is moved out of the blank 10. That movement is interrupted when the mandrel 56 has approximately reached the position shown in FIG. 16, in which it still has its free end portion projecting into the upper end portion of the blank. The removal of a substantial part of the mandrel 56 from the interior of the blank prevents further heat from being transferred from the mandrel 56 to the blank.

Figure 16:
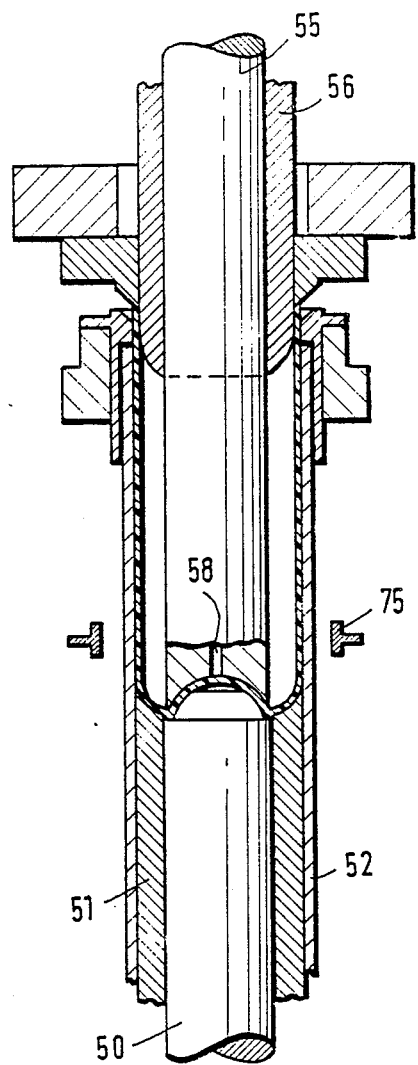

In the intermediate position shown in FIG. 16, the mandrel 56 performs the function of a closure member which closes off the interior of the blank relative to the outside thereof so that the internal pressure generated in the blank is sufficient to press it against the cooling sleeve 52. Although there is a narrow annular ga between the outside surface of the mandrel 56 and the inside surface of the wall portion of the blank 10, the radial dimension of the annular gap is however so small that the flow resistance produced thereby in relation to a discharge flow of compressed air therethrough is sufficient to maintain the necessary internal pressure in the blank. After the blank has been adequately cooled by virtue of the compressed air which is introduced by way of the duct 58, and the transfer of heat from the blank to the cooling sleeve 52, the mandrel 56 is completely removed from the blank until it occupies the position shown in FIG. 17.

Figure 8:
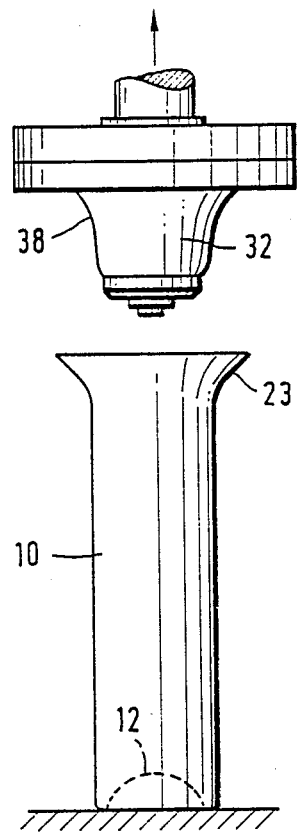
FIG. 8 is a view corresponding to those shown in FIGS. 5 and 7 of the blank after the pre-expansion operation has been carried out.

It will generally not be necessary for the cooling sleeve to be especially cooled, for example by passing a coolant through a cooling system within a cooling sleeve, as the necessary cooling effect, that is to say the amount of heat to be absorbed by the cooling sleeve in each cooling operation, is not very great having regard to the small wall thickness of the blank. It will be appreciated however that it is possible to provide for specific cooling of the cooling sleeve 52. That can also be achieved by the cooling sleeve being subjected to a particular cooling action in its starting position as shown in FIG. 8, for example by blowing air against the cooling sleeve 52 so that it is already at a temperature below ambient temperature when it is moved into the position of surrounding the blank for cooling thereof.

The cooling operation after the thermofixing operation provides that the hot areas of the blank which are cooled by the cooling process experience a drop in temperature which provides for stability in respect of shape thereof. The temperature after the cooling operation may still be considerably higher than the ambient temperature, which is generally room temperature.

Figure 17:
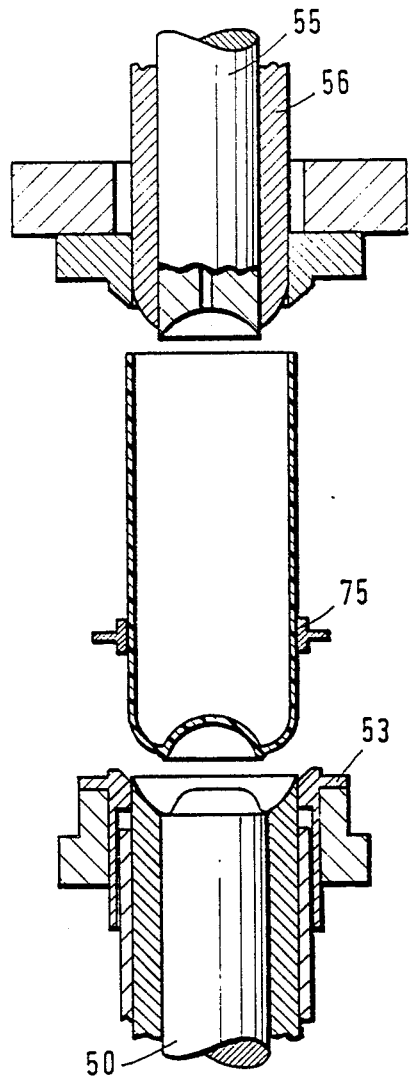

At the same time as the final movement of the mandrel 56 out of the blank, the cooling sleeve 51 and the lower clamping ring 53 are also displaced downwardly so as to free the blank. The gripper 75 can then be closed around the blank. As shown in FIG. 17, the bottom mandrel 50 and the holding mandrel 55 are then moved away from the blank and withdrawn from the blank respectively so that the blank can be transported by the gripper 75 out of the treatment station 28 and to the shaft 30, by virtue of a pivotal movement of the conveyor apparatus 72.

Because the movements of the individual treatment elements in the station 28 are derived from the cam-bearing drum 19 by way of the cam follower rollers 25, as will be readily appreciated from FIGS. 4 and 10, all the elements are moved under positive control, thereby ensuring in every case that the individual treatment elements are correctly associated with each other and with the respective blank to be treated, in respect of time and space. That point also applies in regard to the conveyor apparatus 72 within the treatment unit.

As shown in FIGS. 1 and 4, the cam-bearing drum 19 is driven by a motor 82 whose driveshaft carries a gear 83 meshing with a gear ring 84 mounted on an inwardly projecting flange on the drum 19. A suitable transmission unit may also be disposed between the motor 82 and the gear 83 driven thereby.

Due to the small scale used in FIGS. 1 and 4, those Figures do not show details of the treatment stations 27 and 28 and in particular the tools and other treatment means to be found therein. A similar point applies in regard to FIG. 5. For further details of the configuration of the specific tools and the other treatment means and conveyor arrangements, attention should be directed to FIGS. 6 through 17, as referred to above.

Reference will now be made to FIG. 10 showing the connection between a cam follower roller 25 and the associated tool or other treatment member, as indicated solely by dash-dotted lines. In terms of structure, the assembly may be as shown in FIG. 4, such that each cam follower roller 25 is connected by way of a connecting pin 85 to a carriage or slide 87 which carries the associated treatment tool or member. The respective carriages 87 are guided on guide bars 68 fixed to the outside of the housing 18. The housing 18 which, as described above, is disposed around the outside of the drum 19, has slots 89 extending through the housing 18 and being elongate in the axial direction thereof, through which project the connecting pins 85 connecting each cam follower roller 25 and the associated carriage or slider 87.

The end portion 23 of the blank 10 which had been subjected to the pre-expansion operation is normally separated from the remainder of the blank prior to further treatment thereof or before the blank is put to its definitive use, in order to set the blank to a given length. Accordingly, it is immaterial that the blank leaving the treatment station 28 may in some circumstances include at its free end, wall portions which have been subjected to different treatment operations and which may therefore possibly have different mechanical properties.

It will be appreciated that the above-described embodiment of the process and apparatus in accordance with the present invention have been set forth by way of example thereof and that further modifications and variations may be made therein without thereby departing from the spirit and scope of the invention.

What is claimed is:

1. A process for producing a hollow body of oriented thermoplastic material comprising a wall portion having first and second ends, an opening at the first end and a bottom at the second end, from a hollow blank comprising a substantially cylindrical wall having first and second ends, an opening at said first end and a bottom portion at said second end thereof, wherein the first end portion of said wall of the blank which has said opening is subjected to a pre-expansion operation, the pre-expanded end portion is clamped, and thereafter a heating mandrel is introduced into said blank through said opening of said blank by a relative movement between said heating mandrel and said blank, said mandrel bearing against the wall of said blank and being operative to heat at least the wall of said blank to the temperature required for thermo-fixing of at least said wall and wherein said pre-expanded blank is firstly centered and held between an axially displaceable holding mandrel introduced into said blank through said opening thereof until it comes to bear against said bottom portion thereof and an axially displaceable bottom mandrel which is caused to bear against the outside of said bottom portion, a support sleeve which is disposed around said bottom mandrel and whose inside diameter substantially corresponds to the outside diameter of said blank in the non-pre-expanded region thereof is thereupon displaced upwardly into a position just below said pre-expanded end portion of said blank, a first movable clamping ring which is disposed in coaxial relationship with said support sleeve is displaced axially upwardly to clamp said pre-expanded end portion of said blank between said movable clamping ring and a second clamping ring which surrounds said holding mandrel, said heating mandrel which is arranged in coaxial relationship with said holding mandrel and axially displaceably with respect thereto is then introduced through said opening into said blank, said heating mandrel which bears with its outside surface against the inside surface of said wall of said blank being introduced into said blank which is held by said first and second clamping rings, by a relative movement between said mandrel and said blank, at the same time said support sleeve is displaced downwardly substantially synchronously with the downward movement of said heating mandrel until said heating mandrel has reached an end position in which it is towards said bottom portion of said blank, after a residence time of said heating mandrel which is sufficient to cause thermofixing of said blank a cooling sleeve which is arranged in coaxial relationship with the support sleeve and the bottom mandrel and which is of an inside diameter slightly larger than the outside diameter of the blank which has been heated by said heating mandrel and at least slightly expanded is pushed axially upwardly over said blank, and thereupon a pressure medium is introduced into said blank whereby the wall portion of said blank is lifted off said heating mandrel and pressed with its outside peripheral surface against said cooling sleeve and cooled thereby until it attains a condition of adequate stability in respect of shape.

2. A process as set forth in claim 1 wherein said movable clamping ring is moved by relative movement away from said second clamping ring when said heating mandrel has reached its said end position required for the thermofixing operation.

3. A process as set forth in claim 1 wherein said cooling sleeve is only pushed over said blank when said thermofixing operation is terminated.

4. A process as set forth in claim 1 wherein the degree of expansion of said blank produced by said pressure medium therein is so slight that the increased internal pressure in the blank, due to the flow resistance in an annular gap between said heating mandrel and the inside surface of said blank which is in a condition of bearing against said cooling sleeve, is sufficient to ensure that said wall of said blank bears against said cooling sleeve.

5. A process as set forth in claim 1 wherein said heating mandrel is at least partially drawn out of said blank after said wall thereof bears against said cooling sleeve under the effect of said increased internal pressure.

6. A process as set forth in claim 1 wherein after adequate cooling of said blank said cooling sleeve is moved into a position in which it is away from said blank, thereby freeing said blank, and wherein said blank is engaged on the outside thereof to hold it in position whereupon said bottom mandrel is moved away from said blank and said holding mandrel is withdrawn therefrom.

7. A process as set forth in claim 1 wherein said heating mandrel is of a perceptibly larger diameter than the inside diameter of said non-pre-expanded portion of said wall of said blank whereby said non-pre-expanded portion of said blank is subjected to a perceptible increase in diameter for the purposes of orientation in the peripheral direction of the thermoplastic material forming same.

8. A process as set forth in claim 7 wherein said holding mandrel is moved away from said bottom portion of said blank by a short distance prior to expansion of said molded blank caused by the introduction of said heating mandrel thereinto, said distance corresponding at least to the distance by which the blank experiences a reduction in length due to the increase in its diameter caused by said heating mandrel.

9. A process as set forth in claim 7 wherein said bottom mandrel is moved away from said blank by a distance which corresponds at least to the extent of a temporary elastic increase in length of said blank, prior to the operation of expanding the blank which is effected by the introduction of said heating mandrel.

10. A process as set forth in claim 1 wherein said holding mandrel and said bottom mandrel are caused to bear against said bottom portion of said blank again after said expansion operation and during the thermofixing operation, in order to hold said blank in the region of said bottom portion thereof.

11. A process as set forth in claim 1 wherein said wall portion of said blank is at least substantially cylindrical.

* * * * *